United States Patent
Singh et al.

(10) Patent No.: US 11,218,391 B2
(45) Date of Patent: Jan. 4, 2022

(54) METHODS FOR MONITORING PERFORMANCE OF A NETWORK FABRIC AND DEVICES THEREOF

(71) Applicant: NetApp, inc., Sunnyvale, CA (US)

(72) Inventors: Vijay Singh, San Jose, CA (US); Abhishek Mishra, Santa Clara, CA (US); Douglas Joseph Santry, Kent (GB); Niranjan Desai, Santa Clara, CA (US); Anusha Sivananainthaperumal, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/657,046

(22) Filed: Oct. 18, 2019

(65) Prior Publication Data

US 2020/0177482 A1    Jun. 4, 2020

Related U.S. Application Data

(60) Provisional application No. 62/775,019, filed on Dec. 4, 2018.

(51) Int. Cl.
*H04L 12/24* (2006.01)
*H04L 12/26* (2006.01)
(Continued)

(52) U.S. Cl.
CPC .......... *H04L 43/0817* (2013.01); *G06F 3/067* (2013.01); *G06F 3/0619* (2013.01);
(Continued)

(58) Field of Classification Search
CPC ...... G06F 3/0619; G06F 3/0653; G06F 3/067; G06F 11/3409; G06F 21/552; G06F 11/3093; G06F 11/2294; G06F 11/328; G06F 11/3495; G06F 11/3055; G06F 11/3006; H04L 67/1097; H04L 69/163; H04L 41/046; H04L 43/0876;
(Continued)

(56) References Cited

U.S. PATENT DOCUMENTS

| | | | | |
|---|---|---|---|---|
| 5,819,028 A | * | 10/1998 | Manghirmalani | .. G06F 11/3006 714/57 |
| 8,990,639 B1 | * | 3/2015 | Marr | ........................ G06F 11/24 714/47.3 |

(Continued)

*Primary Examiner* — Aftab N. Khan
(74) *Attorney, Agent, or Firm* — Troutman Pepper Hamilton Sanders LLP (Rochester)

(57) ABSTRACT

Methods, non-transitory machine readable media, and computing devices that manage data storage fabric health are disclosed. With this technology, a network model is applied to network data determined from monitored network traffic exchanged between storage nodes and via network connections over a cluster fabric to generate a health score for the cluster fabric. A cause of health degradation in the cluster fabric is determined based on an analysis of the network data, when the health score indicates that health of the cluster fabric is degrading. A corrective action is automatically initiated based on the cause of health degradation in the cluster fabric. With this technology, cluster fabrics in data storage networks are more effectively monitored for health degradation and, advantageously, corrective actions can be preemptively initiated to improve performance.

14 Claims, 5 Drawing Sheets

(51) Int. Cl.
*G06F 3/06* (2006.01)
*H04L 29/06* (2006.01)
*G06F 11/34* (2006.01)
*H04L 29/08* (2006.01)

(52) U.S. Cl.
CPC ........ *G06F 3/0653* (2013.01); *G06F 11/3409* (2013.01); *H04L 41/12* (2013.01); *H04L 67/1097* (2013.01); *H04L 69/163* (2013.01)

(58) Field of Classification Search
CPC ............... H04L 43/0823; H04L 43/045; H04L 43/0817; H04L 41/142; H04L 41/06; H04L 41/22
See application file for complete search history.

(56) References Cited

U.S. PATENT DOCUMENTS

| | | | |
|---|---|---|---|
| 9,898,315 B1* | 2/2018 | Li | G06F 9/45558 |
| 2004/0125806 A1* | 7/2004 | Barzilai | H04L 47/31 |
| | | | 370/395.21 |
| 2006/0047809 A1* | 3/2006 | Slattery | H04L 67/025 |
| | | | 709/224 |
| 2006/0129870 A1* | 6/2006 | Parent | G06F 11/3688 |
| | | | 714/1 |
| 2009/0249115 A1* | 10/2009 | Bycroft | H04M 7/0057 |
| | | | 714/47.1 |
| 2017/0353486 A1* | 12/2017 | Mironchyk | H04L 63/1425 |
| 2019/0141113 A1* | 5/2019 | Ganapathi | G06N 5/003 |
| 2019/0386918 A1* | 12/2019 | Iyer | H04L 41/12 |
| 2020/0162355 A1* | 5/2020 | Zacks | H04L 43/0876 |

\* cited by examiner

METHODS FOR MONITORING PERFORMANCE OF A NETWORK FABRIC AND DEVICES THEREOF

This application claims the benefit of U.S. Provisional Patent Application Ser. No. 62/775,019, filed on Dec. 4, 2018, which is hereby incorporated by reference in its entirety.

FIELD

This technology generally relates to data storage networks and, more particularly, to methods and devices for monitoring performance and health of a storage network fabric.

BACKGROUND

Data storage networks are increasingly utilized by enterprises to store large amounts of data. A user of a data storage network often has particular requirements for the functionality and operation of the network, including with respect to availability and disaster recovery, which can be encapsulated in a service level agreement (SLA) with an operator or host of the network. Storage nodes, which are often dispersed across a data center and/or geographically across multiple data centers at different sites, execute data storage operations and manage the data storage networks.

Many storage node deployments utilize a disaster recovery fabric to transmit replicated data between nodes, often at different geographic sites, including the contents of non-volatile logs (NVlogs) that store data storage operations, which have been acknowledged to requesting clients but not committed to back-end storage, among other information. NVlog replication generally requires relatively low and predictable latency. Other types of storage replication are also managed by storage nodes, and may require efficient bandwidth management or other performance characteristics, for example.

Disaster recovery fabric can be deployed in the form of an Internet Protocol (IP) fabric and can experience network events, such as loss, queueing delays, or reordering, for example, which can negatively impact storage software executing on the storage nodes. As one example, synchronous disaster recovery software can fall out of sync, resulting in a violation of an SLA. In many cases, the network event is not catastrophic, but still causes an increase in network latency that is significant enough to be noticed by clients, which may enlist support services.

However, it is difficult for support services representatives to ascertain whether the problem that resulted in a network event originated from the network or is associated with software hosted by the storage nodes. Currently, there is no effective way to monitor performance of data storage network fabrics, particularly at edge devices in geographically dispersed IP fabrics across different data centers, in order to predict health degradation or facilitate diagnosis or corrective action.

DETAILED DESCRIPTION

Figure 1:
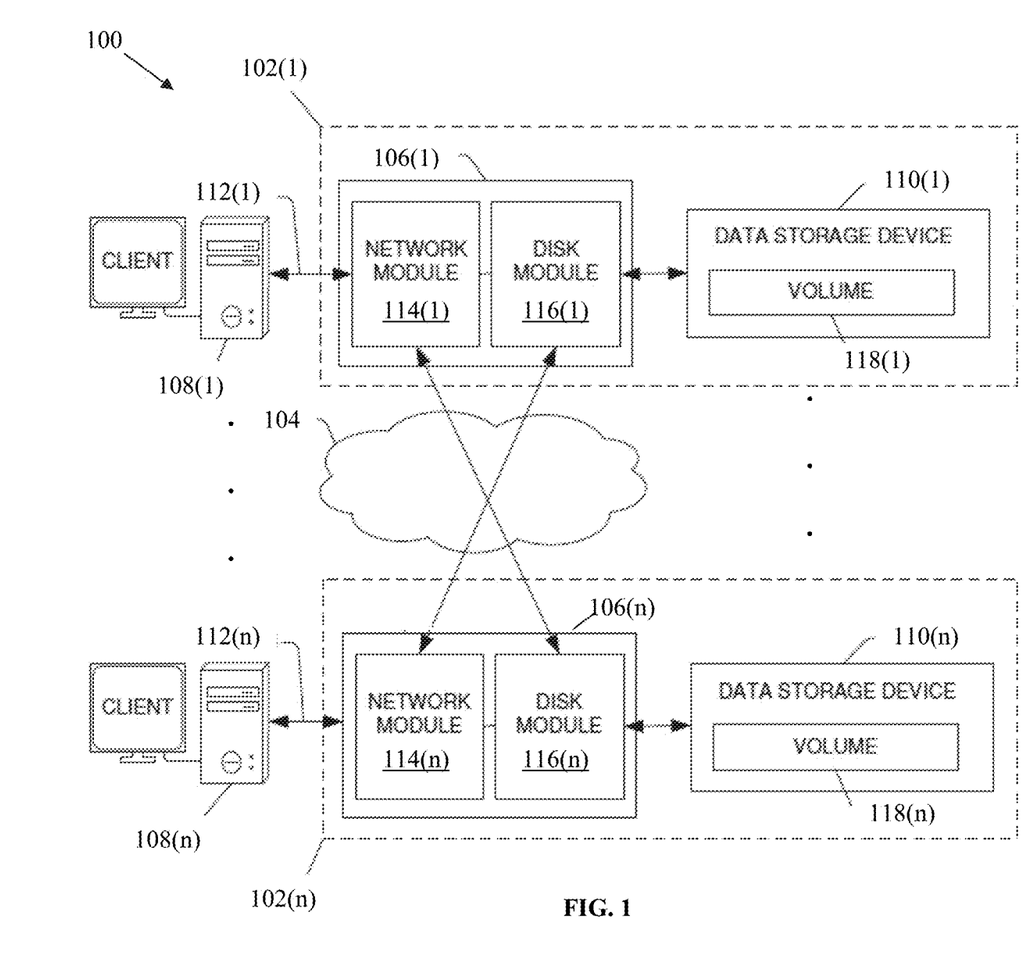
FIG. 1 is a block diagram of a network environment with exemplary node computing devices.

A clustered network environment 100 that may implement one or more aspects of the technology described and illustrated herein is shown in FIG. 1. The clustered network environment 100 includes data storage apparatuses 102(1)-102(n) that are coupled over a cluster or data fabric 104 that includes one or more communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and computing devices that more effective monitor data fabric health to identify degradation and initiate corrective actions to improve storage network performance.

In this example, node computing devices 106(1)-106(n) can be primary or local storage controllers or secondary or remote storage controllers that provide client devices 108(1)-108(n) with access to data stored within data storage devices 110(1)-110(n) and cloud storage device(s) 136. The data storage apparatuses 102(1)-102(n) and/or node computing devices 106(1)-106(n) of the examples described and illustrated herein are not limited to any particular geographic areas and can be clustered locally and/or remotely via a cloud network, or not clustered in other examples.

Figure 2:
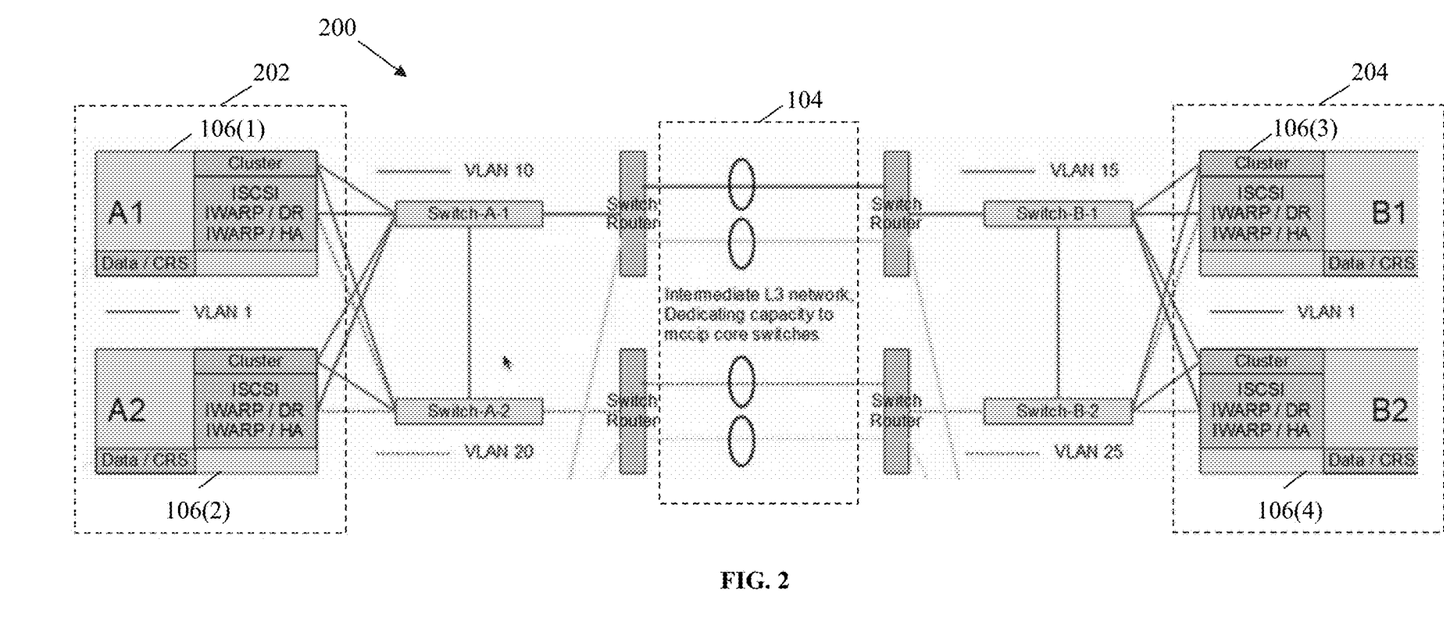
FIG. 2 is a block diagram of another network environment with two exemplary pairs of exemplary node computing devices each in high availability (HA) arrangement.

Referring to FIG. 2, a block diagram is illustrated of another network environment 200 with two exemplary pairs 202 and 204 of exemplary node computing devices 106(1) and 106(2) and 106(3) and 106(4), respectively, each in high availability (HA) arrangement. In this example, the pairs 202 and 204 of node computing devices 106(1), 106(2), 106(3), and 106(4) communicate across a data fabric 104 utilizing TCP/IP to exchange replicated data for disaster recovery purposes, although other types of arrangements of node computing devices for other purposes can also be used in other examples.

Thus, referring to FIGS. 1-2, in some examples the data storage apparatuses 102(1)-102(n) and/or node computing device 106(1)-106(n) can be distributed over a plurality of storage systems located in a plurality of geographic locations. In other examples, a clustered network can include data storage apparatuses 102(1)-102(n) and/or node computing device 106(1)-106(n) residing in a same geographic location (e.g., in a single on-site rack), and other arrangements can also be used. Accordingly, any number of node computing devices or data storage apparatuses communicating across a data fabric can be included in other examples in other types of configurations or arrangements.

One or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within cloud storage device(s) 136), etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing).

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks (i.e., cloud networks) embodied as Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more of the cloud storage device(s) 136 to provide tiered storage, for example, and other arrangements can also be used in other examples.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
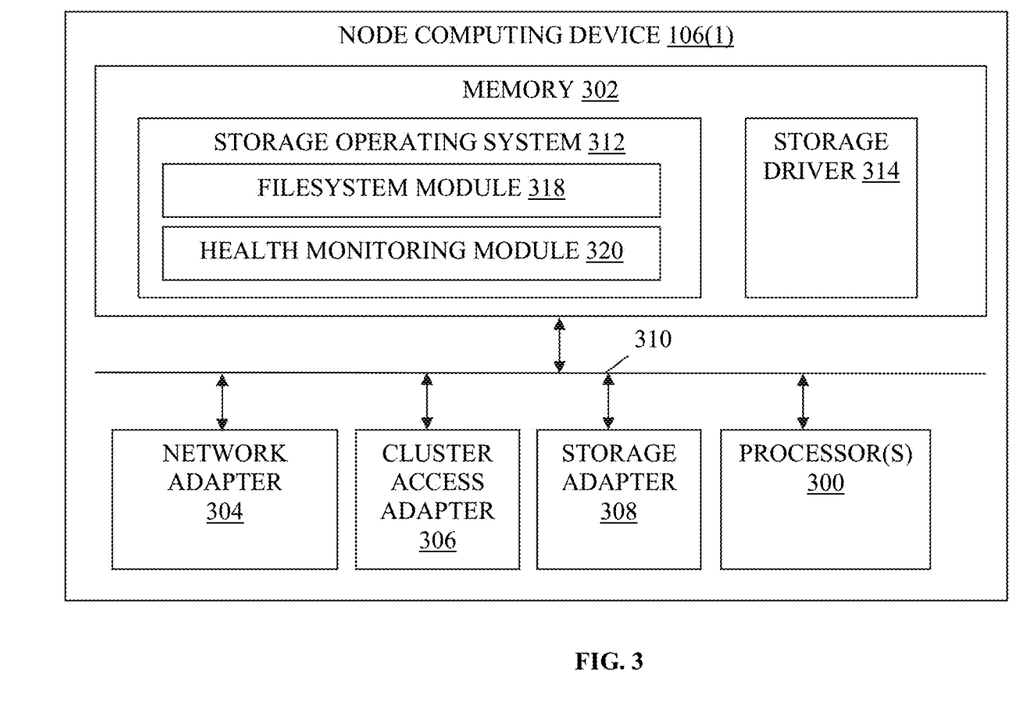
FIG. 3 is a block diagram of one of the exemplary node computing device of FIG. 1 or FIG. 2.

Referring to FIG. 3, node computing device 106(1) in this particular example includes processor(s) 300, a memory 302, a network adapter 304, a cluster access adapter 306, and a storage adapter 308 interconnected by a system bus 310. The node computing device 106(1) also includes a storage operating system 212 installed in the memory 206 that can, for example, implement a RAID data loss protection and recovery scheme to optimize reconstruction of data of a failed disk or drive in an array. In some examples, the node computing devices 106(2), 106(3), 106(4), and/or 106(n) are substantially the same in structure and/or operation as node computing device 106(1), although the node computing devices 106(2), 106(3), 106(4), and/or 106(n) can also include a different structure and/or operation in one or more aspects than the node computing device 106(1).

The network adapter 304 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 304 further communicates (e.g., using TCP/IP) via the cluster fabric 104 and/or another network (e.g. a WAN) (not shown) with cloud storage device(s) (not shown) to process storage operations associated with data stored thereon.

The storage adapter 308 cooperates with the storage operating system 312 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSl, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 108(1)-108(2) and/or sent to another node computing device attached via the cluster fabric 104. In some examples, a storage driver 314 in the memory 302 interfaces with the storage adapter 308 to facilitate interactions with the data storage devices 110(1)-110(n).

The storage operating system 312 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or cloud storage device(s) or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 106(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a health monitoring module 320 configured to monitor network traffic exchanged via the cluster fabric 104 with other node computing devices to train, test, and validate a network model. The monitoring includes extracting values for TCP parameters, for example. Subsequent to validation, the health monitoring module 320 deploys the network model by applying the network model to network traffic received via the cluster fabric to determine whether the health of the cluster fabric 104 may be degrading based on observed network events or anomalies. The health monitoring module is also configured in this example to automatically initiate correct actions to improve the health and performance of the cluster fabric 104. The operation of the health monitoring module 320 is described and illustrated in more detail later with reference to FIGS. 4-5.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 4-5, for example.

Figure 4:
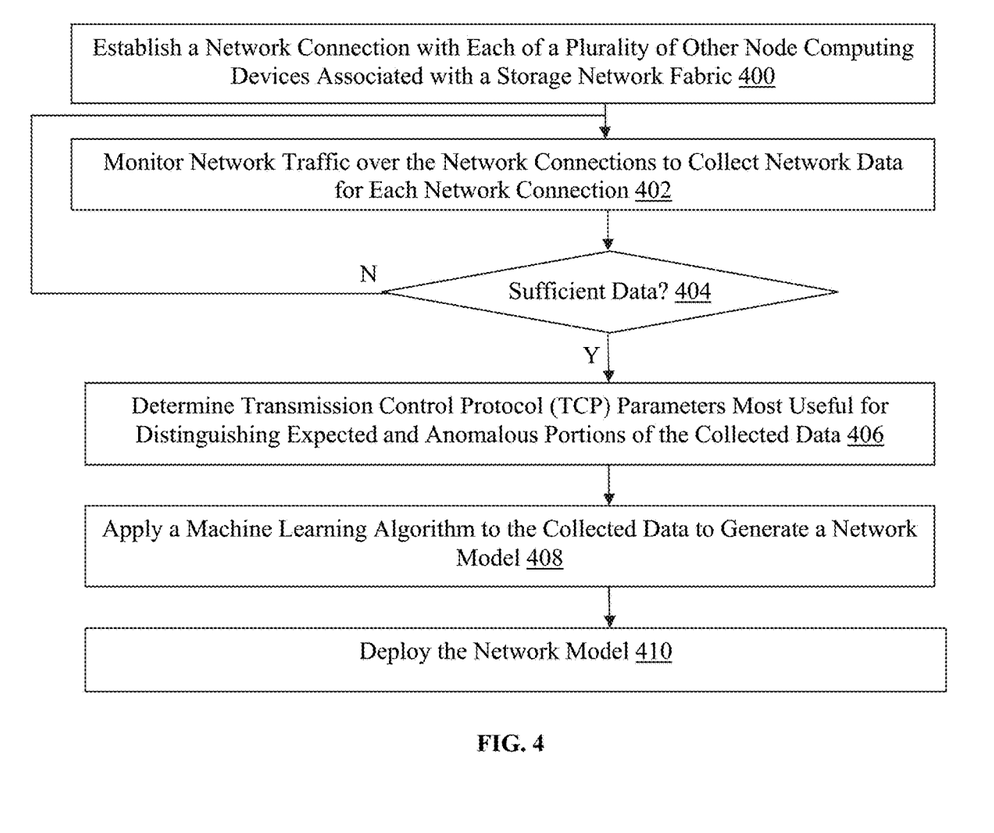
FIG. 4 is a flowchart of an exemplary method for generating and deploying a network model.

Referring to FIG. 4, a flowchart of an exemplary method for generating and deploying a network model is illustrated. In step 400 in this example, the node computing device 106(1) establishes a network connection with each of a plurality of other node computing devices associated with the cluster fabric 104, such as node computing devices 106(3) and 106(4) in the example illustrated in FIG. 2, for example. The network connections can include TCP connections in this example, although other types of connections utilizing other protocols can also be used in other examples. In some examples, the connections are established to replicate data and storage operations to facilitate disaster recovery in a storage network, although the network connections can also be utilized for other purposes in other examples.

In step 402, the node computing device 106(1) monitors network traffic over the established network connections to collect network data. In this example, the network data includes values for various TCP parameters extracted from the network traffic. The network data can include source and destination IP addresses, round trip time (e.g., smoothed round trip time), packet loss data, data associated with the delays due to queuing in the cluster fabric 104, retransmission timeouts, packet reordering data, and congestion data (e.g., notification data or send congestion window size), for example.

In step 404, the node computing device 106(1) determines whether sufficient network data has been obtained. In one example, network data is obtained for a period of time in which good or expected network traffic is observed as well as disruptions, such as delays, reordering, and/or packet loss, or other anomalous network traffic is observed. The network data is optionally divided into training, validation, and test data sets. Additionally, the node computing device 106(1) can sort the network data by fabric using IP subnet information, in examples in which multiple fabrics are present in the cluster of node computing devices and/or by protocol (e.g., Internet Small Computer Systems Interface (iSCSI) and/or Internet Wide Area remote direct memory access (RDMA) Protocol (iWARP)) for each fabric.

Accordingly, the node computing device 106(1) in this examples determines whether sufficient network data has been collected that will facilitate a relatively accurate machine learning process. The sufficiency of the data can be determined based on the volume of the network data for particular dimensions or overall for a particular set (e.g., training, testing, and validation) or the quality of the collected data (e.g., a threshold number of observed disruptions), and other parameters can be used to determine the sufficiency of the collected network data. If the node computing device 106(1) determines that sufficient network data has not been collected, then the No branch is taken back to step 402 and the node computing device 106(1) continues monitoring the network traffic. However, if the node computing device 106(1) determines that sufficient network data has been collected, then the Yes branch is taken to step 406.

In step 406, the node computing device 106(1) optionally determines the TCP parameters that are most useful for distinguishing expected and anomalous portions of the collected network data. In one example, the node computing device 106(1) can use principal component analysis (PCA) to identify the particular TCP parameters, although other methods can also be used in other examples.

In one example, a significant divergence in the smoothed round trip time of connections traversing the cluster fabric 104 from an established or average round trip may be indicative of queuing delays. In another example, if a significant number of connections report retransmission timeouts over a sampling interval, then there may have been a loss event in the cluster fabric 104. If this loss is sustained over a number of sampling intervals, then the cluster fabric 104 may be overprovisioned and is experiencing a tail-drop.

In step 408, the node computing device 106(1) applies a machine learning algorithm to the collected network data, and/or performs a regression analysis, to identify anomalies in various network characteristics such as delays, loss and reordering and generate a network model. In this example, information regarding the parameters determined in step 406 and the training set of network data is used to train the network model.

In particular, the node computing device 106(1) determines the weights of different components or factors (e.g., TCP parameters) that can be applied to generate a health score that is indicative of whether the health of the cluster fabric 104 may be degrading due to anomalous network event(s). In this example, the network model is trained using the training data, the accuracy of the network model is increased using the validation data, and the network model is tested using the testing data.

In step 410, the node computing device 106(1) deploys the network model, such as by storing the network model in the memory 302 with an indication that the network model is in condition to be applied in real-time to live network traffic exchanged via the cluster fabric 104. In some examples, each node computing device of a cluster generates its own respective network model based on locally-observed network traffic, which may differ from one or more other of the network models generated and deployed by other node computing devices in a same cluster.

Figure 5:
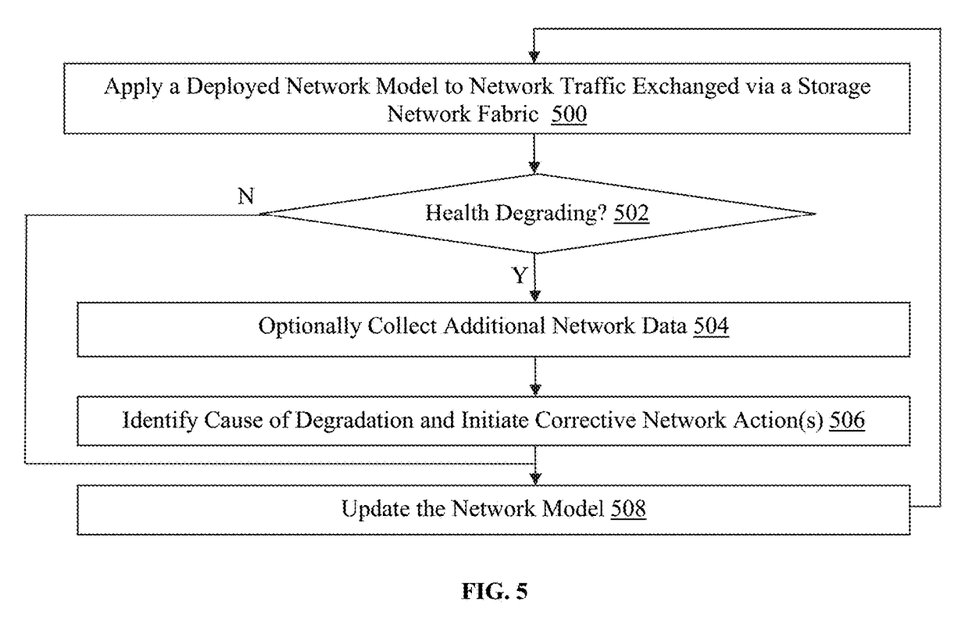
FIG. 5 is a flowchart of an exemplary method for utilizing a deployed network model to analyze health of a storage network fabric.

Referring more specifically to FIG. 5, a flowchart of an exemplary method for analyzing health of a storage network fabric is illustrated. In step 500 in this example, the node computing device 106(1) applies a deployed network model to live network traffic exchanged via TCP connections across the cluster fabric 104. Optionally, the node computing device 106(1) can apply the network model to network data extracted from the network traffic over a sampling time period window. Also optionally, one or more portions of the extracted network data can be manipulated before the application of the network model, such as aggregated, averaged, filtered, and/or categorized, for example.

In step 502, the node computing device 106(1) determines whether the health of cluster fabric 104 is degrading. In one example, the application of the deployed network model in step 500 yields a health score that is indicative of the health of the cluster fabric 104. If the health score exceeds a threshold, or diverges from historical health score(s) by a threshold amount, for example, then the node computing device 106(1) can determine that the health of the cluster fabric 104 is degrading, although other methods of determining that the health of the cluster fabric 104 is degrading can also be used in other examples.

In one particular example, the round trip time of connections is progressively increasing and the network model applies a weight to various TCP parameters, including the round trip time, and generates an elevated (or reduced) health score that exceeds a predefined threshold and indicates that functionality of the cluster may soon be adversely impacted. Other types of parameters and outputs by the network model can also be used in other examples. If the node computing device 106(1) determines that the health of the cluster fabric 104 is degrading, then the Yes branch is taken to step 504.

In step 504, the node computing device 106(1) optionally collects additional network data from observed network traffic. The additional network data can include packet captures or additional command outputs, for example, which can be stored in association with each other, and other collected network data that resulted in the health score exceeding the threshold, for later retrieval as part of an episode or adverse network event. Support personnel can subsequently retrieve the stored data and provide valuable insights about the cause of the degradation in the health of cluster fabric 104, such as packet losses or queueing delays, for example.

In step 506, the node computing device 106(1) initiates a corrective network action based on a network event or anomaly determined from the network data. In this example, the node computing device 106(1) can analyze the network data that lead to an elevated health score output from the network model to identify a cause of the degradation in health. The corrective action(s) can include issuing a warning to a cluster administrator, injecting a network script to correct a detected network anomaly, switching to another network fabric, or throttling network traffic associated with the affected cluster fabric 104, for example, although other types or numbers of corrective network actions can also be performed.

In one example, the node computing device 106(1) can determine that a temporary congestion network event has resulted from packet drops, leading to loss of throughput. The node computing device 106(1) in this example can throttle network traffic in an effort to remedy the congestion event. The network model can effectively correlate network data from multiple network connections to identify a general network issue (e.g., congestion) instead of an issue that is affecting a single network connection, and the corrective action (e.g., throttling) can be initiated accordingly. Subsequent to initiating the corrective network action(s) in step 506, or if the node computing device 106(1) determines in step 502 that the health of the cluster fabric 104 is not degrading and the No branch is taken, then the node computing device 106(1) proceeds to step 508.

In step 508, the node computing device 106(1) optionally updates the network model. Accordingly, in this example, the network model is continuously or periodically trained subsequent to deployment, although it is no longer validated or tested. Subsequent to updating the network model, the node computing device 106(1) proceeds back to step 500 and continues applying the network model to observed network traffic. In other examples, one or more of steps 500-508 can be performed in parallel and/or in a different order.

In other examples, this technology includes means for applying a network model to network data determined from monitored network traffic exchanged between storage nodes and via network connections over a cluster fabric to generate a health score for the cluster fabric. Means for determining a cause of health degradation in the cluster fabric is determined based on an analysis of the network data, when the health score indicates that health of the cluster fabric is degrading, are also provided. Additionally, this technology includes means for automatically initiating a corrective action based on the cause of health degradation in the cluster fabric.

In these examples, the disclosed technology can also include means for applying one or more weights to one or more of the values for the TCP parameters in order to apply the network model. Further, means for training, testing, and validating the network model using a machine learning algorithm are also provided. Even further, this technology can includes means for determining one or more of the TCP parameters useful for distinguishing expected and anomalous portions of collected training network data used to train the machine learning algorithm. Additionally, means for throttling other network traffic received via the cluster fabric when the cause of the health degradation comprises network congestion are also provided.

With this technology, cluster fabrics in data storage networks are more effectively monitored for health degradation and corrective actions can be preemptively initiated to improve performance. In particular, this technology advantageously facilitates network monitoring for cluster fabrics that include IP networks, which can extend across geographically dispersed nodes and data centers. This technology can also provide critical information to storage network administrators regarding anomalous network traffic to facilitate more accurate diagnosis and mitigation of adverse network events.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   training, testing, and validating, by a computing device, a network model using a machine learning algorithm, wherein the network model comprises one or more weights for a first one or more TCP performance parameters identified as indicative of a network anomaly based on observed network traffic exchanged via network connections between storage nodes of a cluster fabric;
   applying, by the computing device, the network model to Transmission Control Protocol (TCP) performance data determined via passive monitoring of additional network traffic exchanged via the network connections to generate a health score for the cluster fabric;
   determining, by the computing device, a cause of health degradation in the cluster fabric based on an analysis of the TCP performance data, when the health score indicates that health of the cluster fabric is degrading; and
   automatically initiating, by the computing device, a corrective action selected based on the cause of health degradation in the cluster fabric, wherein the cause is correlated with a second one or more TCP performance parameters extracted from the TCP performance data to which the network model was applied to generate the health score.

2. The method of claim 1, wherein the network connections comprise TCP connections.

3. The method of claim 1, further comprising determining, by the computing device, one or more of the first one or more TCP performance parameters useful for distinguishing expected and anomalous portions of collected training network data used to train the machine learning algorithm.

4. The method of claim 1, further comprising throttling, by the computing device, other network traffic received via the cluster fabric when the first one or more TCP performance parameters comprise packet drops and the cause of the health degradation comprises network congestion.

5. A non-transitory machine readable medium having stored thereon instructions for managing data storage fabric health comprising machine executable code which when executed by at least one machine causes the machine to:
   train, test, and validate a network model using a machine learning algorithm, wherein the network model comprises one or more weights for a first one or more TCP performance parameters identified as indicative of a network anomaly based on observed network traffic exchanged via network connections between storage nodes of a cluster fabric;
   apply the network model to Transmission Control Protocol (TCP) performance data determined via passive monitoring of additional network traffic exchanged via the network connections to generate a health score for the cluster fabric;
   determine a cause of health degradation in the cluster fabric based on an analysis of the TCP performance data, when the health score indicates that health of the cluster fabric is degrading; and
   automatically initiate a corrective action selected based on the cause of health degradation in the cluster fabric, wherein the cause is correlated with a second one or more TCP performance parameters extracted from the TCP performance data to which the network model was applied to generate the health score.

6. The non-transitory machine readable medium of claim 5, wherein the network connections comprise TCP connections.

7. The non-transitory machine readable medium of claim 5, wherein the machine executable code when executed by the machine further causes the machine to determine one or more of the first one or more TCP performance parameters useful for distinguishing expected and anomalous portions of collected training network data used to train the machine learning algorithm.

8. The non-transitory machine readable medium of claim 5, wherein the machine executable code when executed by the machine further causes the machine to throttle other network traffic received via the cluster fabric when the first one or more TCP performance parameters comprise-packet drops and the cause of the health degradation comprises network congestion.

9. A computing device, comprising:
   a memory containing machine readable medium comprising machine executable code having stored thereon instructions for managing data storage fabric health; and
   a processor coupled to the memory, the processor configured to execute the machine executable code to cause the processor to:
   train, test, and validate a network model using a machine learning algorithm, wherein the network model comprises one or more weights for a first one or more TCP performance parameters identified as indicative of a network anomaly based on observed network traffic exchanged via network connections between storage nodes of a cluster fabric;
   apply the network model to Transmission Control Protocol (TCP) performance data determined via passive monitoring of additional network traffic exchanged via the network connections to generate a health score for the cluster fabric;
   determine a cause of health degradation in the cluster fabric based on an analysis of the TCP performance data, when the health score indicates that health of the cluster fabric is degrading; and
   automatically initiate a corrective action selected based on the cause of health degradation in the cluster fabric, wherein the cause is correlated with a second one or more TCP performance parameters extracted from the TCP performance data to which the network model was applied to generate the health score.

10. The computing device of claim 9, wherein the network connections comprise TCP connections.

11. The computing device of claim 9, wherein the processor is further configured to execute the machine executable code to further cause the processor to determine one or more of the first one or more TCP performance parameters useful for distinguishing expected and anomalous portions of collected training network data used to train the machine learning algorithm.

12. The computing device of claim 9, wherein the processor is further configured to execute the machine executable code to further cause the processor to throttle other network traffic received via the cluster fabric when the first one or more TCP performance parameters comprise-packet drops and the cause of the health degradation comprises network congestion.

13. The computing device of claim 9, wherein the processor is further configured to execute the machine executable code to further cause the processor to analyze the TCP performance data to identify a network anomaly in the cluster fabric, wherein the corrective action is selected based on a type of the identified network anomaly.

14. The computing device of claim 13, wherein portions of the network data correspond with respective ones of the network connections and the processor is further configured to execute the machine executable code to further cause the processor to correlate the portions of the network data to identify the network anomaly.

\* \* \* \* \*